United States Patent [19]

Calder et al.

[11] 4,289,678

[45] Sep. 15, 1981

[54] ACRYLIC THICKENER FOR PUBLICATION GRAVURE INKS, METHOD OF PREPARING SAID THICKENER, INK CONTAINING THE SAME AND METHOD OF PRINTING

[75] Inventors: G. Vincent Calder, Richboro; Andrew Mercurio, Ambler, both of Pa.

[73] Assignee: Rohm and Haas Company, Philadelphia, Pa.

[21] Appl. No.: 85,359

[22] Filed: Oct. 16, 1979

Related U.S. Application Data

[63] Continuation of Ser. No. 831,466, Sep. 8, 1977, abandoned.

[51] Int. Cl.³ .............. C08K 5/01; C08L 93/04; C08F 220/06; C09D 11/10
[52] U.S. Cl. .............. 260/33.6 UA; 106/20; 106/30; 106/32; 260/27 R; 526/271; 526/272; 526/287; 526/303; 526/304; 526/317; 526/318
[58] Field of Search .............. 260/33.6 UA, 27 R; 106/30, 20, 32; 526/271, 286, 287, 304, 303, 317, 318, 272

[56] References Cited

U.S. PATENT DOCUMENTS

| | | | |
|---|---|---|---|
| 3,266,914 | 8/1966 | Varron | 106/29 |
| 3,533,811 | 10/1970 | Cleme nts et al. | 106/24 |
| 3,764,587 | 10/1973 | Zunker | 526/317 |
| 3,823,110 | 7/1974 | Epple | 526/317 |
| 3,875,099 | 4/1975 | Kurth et al. | 526/317 |
| 3,887,513 | 6/1975 | Fritze et al. | 260/33.6 UA |
| 3,912,675 | 10/1975 | Hoshi et al. | 260/28.5 A |
| 4,018,728 | 4/1977 | Priest | 260/33.6 UA |
| 4,048,132 | 9/1977 | Tsuchiya et al. | 260/33.6 UA |

OTHER PUBLICATIONS

Chem. Abst. vol. 80, Vehicle for Gravure Printing Ink, 97528r:1974.
Chem. Abst. vol. 84, Stable Gravure Printing Ink Dispersions, 46321t:1976.

Primary Examiner—John Kight, III

[57] ABSTRACT

A thickened organic solvent based system, particularly an aliphatic hydrocarbon-based liquid composition, such as an ink, the polymeric thickener therefor, a method of making the thickener by emulsion polymerization, and methods of using the thickener are disclosed. The thickener is an addition polymer of ethylenically unsaturated (A) hydrophobic monomers being within the hydrogen bonding class of from moderate to poor and (B) hydrophilic monomers being in the strong hydrogen bonding class in a weight ratio of hydrophobic: hydrophilic monomer between about 99.1:0.1 and 90:10, at least about 60% of the hydrophobic monomer(s) (A) are those whose homopolymers have a solubility parameter of $\leq 8.8$, any other hydrophobic monomer(s) being such as to not destroy the organic solvent solubility of the polymer. The hydrophilic monomer(s) (B) preferably comprise at least a predominant proportion of monomers containing at least one of a carboxylic acid group and a sulfonic acid group. The molecular weight range of the polymer ($\overline{M}w$ 100,000–2,000,000), the solubility thereof in certain solvents, the $T_g$ ($\geq 30°$ C.) and the like are critical for use of the materials in nonpolar or weak solvent-based inks.

31 Claims, 1 Drawing Figure

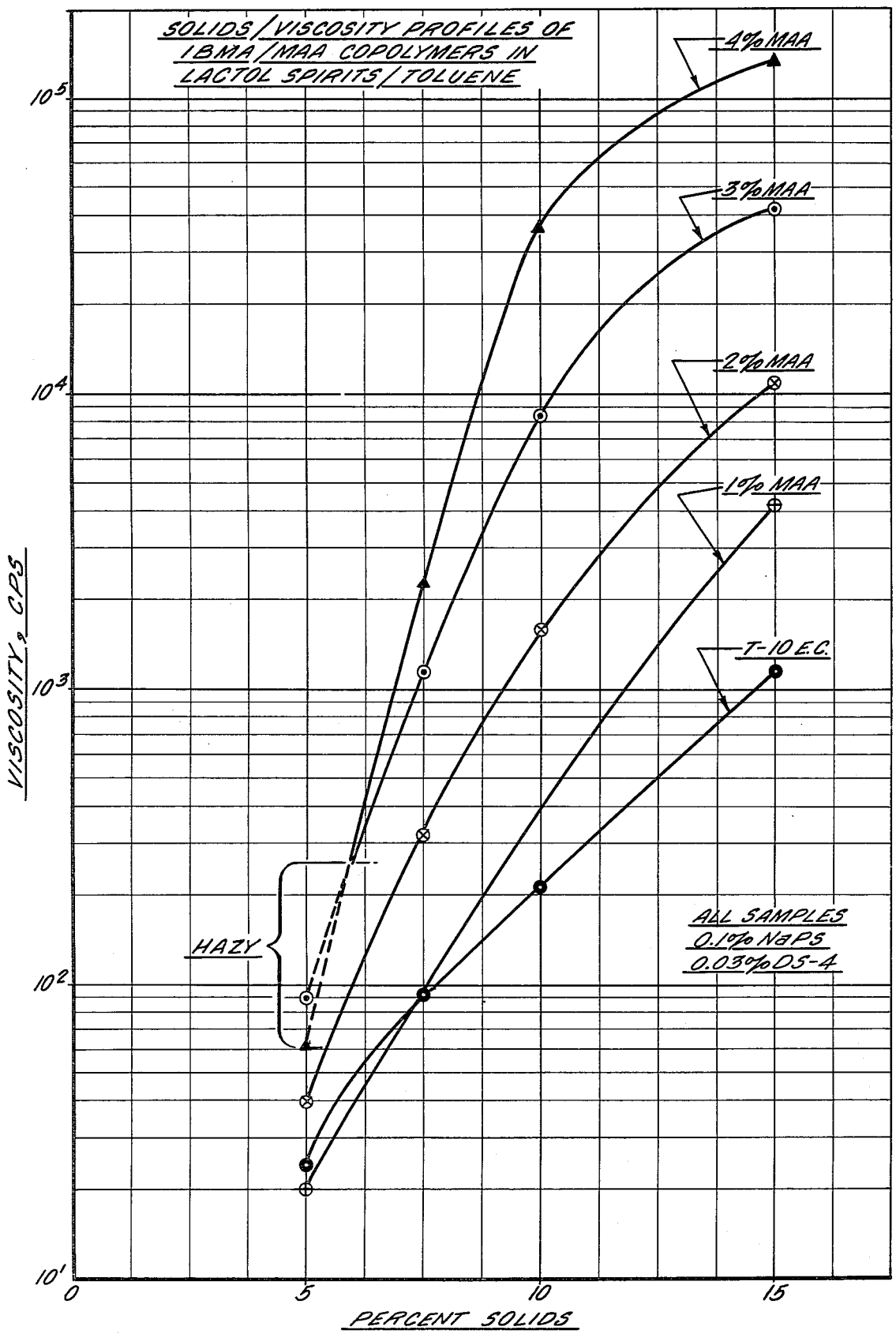

ACRYLIC THICKENER FOR PUBLICATION GRAVURE INKS, METHOD OF PREPARING SAID THICKENER, INK CONTAINING THE SAME AND METHOD OF PRINTING

This is a continuation of application Ser. No. 831,466 filed Sept. 8, 1977, now abandoned.

BRIEF DESCRIPTION OF THE INVENTION

This invention relates to a weak organic solvent-based liquid system, particularly an aliphatic hydrocarbon based liquid such as a colored ink, the thickener therefor, a method of making the thickener preferably by emulsion polymerization, and a method of using the thickener. The novel thickener is an acrylic copolymer of hydrophobic and hydrophilic monomers, specific preferred copolymers being of isobutyl methacrylate and one or more acids selected from acrylic acid, methacrylic acid and itaconic acid in weight ratios of between about 99.9:0.1 and 90:10 with narrower ranges being preferred. The preferred acid is methacrylic acid. Other ethylenically unsaturated addition-polymerizable hydrophobic and hydrophilic monomers are useful in place of or with the preferred monomers, as long as the thickener is soluble in aliphatic hydrocarbons and has molecular weight limits which cause it to function as a thickener in such a system. The organic solvent is preferably at least predominantly an aliphatic hydrocarbon, for example a mixture thereof with a minor amount of an aromatic hydrocarbon. Particularly beneficial is the use of this thickener in gravure inks.

The uses of these weak solvent-soluble thickener polymers include:
(1) Thickeners for Type A and Type B gravure inks, a preferred use.
(2) In sealants and caulks for masonry.
(3) Textile pigment printing inks or paste auxiliary.
(4) Toughening modifier for powder coatings.
(5) Binder/modifier for wet and dry toner systems— Electrofax, Xerography, and related electrophotographic techniques.
(6) Anti-sag additive for hot melt adhesives.
(7) Thickeners for aliphatic hydrocarbon systems in general.

The thickener polymer is uncrosslinked. That is, essentially no polyunsaturated addition-polymerizable monomers are used. Any incidental crosslinking of the polymer prior to its application to a substrate, as in the form of an ink, is such as not to destroy the compatibility of the polymer with the solvent, binder, etc.

BACKGROUND OF THE INVENTION

Metallated rosin inks for gravure printing commonly contain ethyl cellulose or ethyl hydroxyethyl cellulose as a thickener. However, the prices of ethyl cellulose and of other cellulose derivatives has escalated to an extent that a substitute (partial or complete) is needed. As is known, limed rosin has long been used in similar inks as is noted in U.S. Pat. No. 3,409,449, which gives suitable dyes and pigments for use in such inks.

U.S. Pat. No. 2,886,549 is concerned with aliphatic hydrocarbon (benzine) soluble acrylic polymers for use as lacquers, inks, and textile impregnants. The polymer is solution polymerized at 90° C. and 120° C. which would give a low molecular weight polymer, and molecular weight (not specified) can be controlled with conventional polymerization regulators. The polymers have at least two components, with a third optional component. The first component (50–90 parts) is a cycloalkyl ester of an unsaturated acid such as acrylic acid, methacrylic acid or fumaric acid, etc; the preferred alcohol moiety is, for example, cyclohexanol, mono-, di-, or trimethyl cyclohexanol, or other substituted cyclohexanol. The second component (10–50 parts) is an ester of (meth)acrylic acid with an alcohol of at least eight carbon atoms, preferably 10–18 carbons. The third and optional component (1–20 parts) is a different polymerizable compound such as vinyl acetate, styrene, etc., or one having a reactive aldehyde, epoxy, carboxy, etc. group. Of the examples, Examples 1 (80 cyclohexyl methacrylate (CHMA), 20 dodecyl methacrylate (DMA)) gives a polymer with the highest calculated $T_g$ of the examples—just below 30° C. At 90 CHMA and 10 DMA, the calculated (not actual) $T_g$ would be about 45° C. As elsewhere herein, unless specified otherwise, the $T_g$ is the calculated value using the method of Fox (infra). At 50 CHMA and 50 DMA, this value would be $-15°$ C. Being solution polymerized at high temperatures, the polymer would have a quite low molecular weight.

A similar disclosure of alkane (ligroine or benzine) soluble acrylic polymers appears in British patent No. 772,746, which, based on CA. 51, 10925f, involves a copolymer of 20–40% of a higher alkyl ester such as dodecyl methacrylate or cyclohexyl methacrylate, with styrene and the like. An example is given of a polymer in parts by weight of 680 styrene, 320 dodecyl methacrylate, and 200 methyl methacrylate. This would have a calculated $T_g$ of about 36° C. and, because of the polymerization method, a very low molecular weight. If it is assumed the polymer is 20 CHMA and 80 styrene, the calculated $T_g$ is about 90° C. whereas with 20 DMA and 80 St the figure is about 50° C. The polymer may be combined with other coating materials such as drying oils, phthalic acid resins, etc.

A condensation polymer, of a copolymer of acrylic acid-butyl methacrylate-methyl methacrylate with rosin modified by glycerol, fumaric acid and pentarythritol, for use as an additive in rosin inks, is the subject of Japanese patent publication No. 73/18,332 June 5, 1973. This is reported in Chemical Abstracts 80:97528r.

Experimental use has also been made of solution-polymerized polymers of 97% isobutyl methacrylate and 3% of a methacrylate; these were not wholly satisfactory, because solution-polymerized polymers inherently have low molecular weights, and are comparatively inefficient thickeners.

CA 84:46321T discloses a gravure ink of a low $T_g$ alkane soluble acrylic resin and an alkane insoluble acrylic resin.

Another reference of possible interest is U.S. Pat. No. 2,803,611, concerned with an adhesive which contains a blend of a copolymer of lauryl and hexyl methacrylates with limed rosin, a wax-naphthalene condensate and a solvent, particularly a hydrocarbon solvent. These higher methacrylic acid esters give very soft ($T_g < -5°$ C.) polymers which normally cannot be produced as a powder. In addition, they have a plasticizing effect upon the hard binder and are not shown by the reference to have any effect in thickening the composition, particularly so in view of the fact that clay is included in the composition to give thickening.

A U.S. patent application related to the present application is that of Swift et al, Ser. No. 766,391, filed Feb. 7, 1977; it concerns lithographic inks in which the binder is a copolymer, having a $\overline{M}n$ of 1,000 to 15,000, of up to 40% isobornyl methacrylates (iBOMA) with, for example, isobutyl methacrylate and an unsaturated acid. The ink contains an aliphatic hydrocarbon solvent.

Another patent concerned with isobornyl methacrylate is U.S. Pat. No. 3,485,775. It discloses polymers containing 25–75% isobornyl methacrylate and substantial amounts of methyl methacrylate mers, which detract from hydrocarbon solubility of the polymer. Small amounts of styrene, ethyl acrylate, or butyl acrylate are permitted. The disclosed molecular weight range of the polymers of this reference is between 10,000 to 2,000,000. No unsaturated acid monomers are suggested.

U.S. Pat. No. 3,681,298 discloses polymers having a molecular weight range of 1,000 to 8,500, containing 40–60% isobornyl methacrylate and 40–60% of methyl methacrylate, styrene, s-butyl methacrylate, or o-butyl methacrylate, and up to 5% of an unsaturated acid, and the use of solvents comprising or consisting of paraffins, e.g., octane. Amounts of monomers such as methyl methacrylate for such low molecular weight polymers do not appear to be particularly critical; thus about 50% methyl methacrylate is useful. In the present invention, involving high molecular weight polymers, such quantities of methyl methacrylate would result in insoluble polymers. The pending application Ser. No. 766,391 and the latter two patents are assigned to the assignee of the instant application.

Other acrylic copolymers for inks are also known, as shown for example in U.S. Pat. No. 3,764,587 (Zunker). The inherent viscosity of the polymer of the latter patent, a measure of molecular weight, is between 0.2 and 0.35 measured at 25° C. using 25 milligrams of polymer in 5 cc. of chloroform, which suggest a Mw of 100,000 or greater. The monomers in the polymer are such as would yield in some cases a very rubbery, soft product, having a very low calculated $T_g$ as defined herein. In other cases, depending upon the selection of monomers and ratios, a polymer containing ethyl methacrylate could be obtained which has a calculated $T_g$ of about 40° C. or slightly greater. Ethyl methacrylate, however, as a monomer has a solubility parameter of about 8.3 and a homopolymer thereof has a solubility parameter of about 9.0; the $T_g$ of a homopolymer of ethyl methacrylate being about 65° C., all as shown hereinbelow.

The Aronoff et al polymer (U.S. Pat. No. 3,271,347), in one embodiment is primarily of vinylidene chloride, with acrylic acid, methacrylic acid, or itaconic acid, and with the optional inclusion of other monomers. The vinylidene chloride copolymers have molecular weights in the range of 3,000 to 5,000. Aronoff et al also mention all-acrylic copolymers, the invention being in the inclusion of polyoxethylene ethers in materials such as inks. No method of preparing the acrylic polymer is disclosed nor are molecular weights. The specific acrylics disclosed have extremely low calculated $T_g$'s. Aronoff et al disclose solvents, including aliphatic hydrocarbons, aromatic hydrocarbons, ketones, alcohols, etc.

Hoshi et al U.S. Pat. No. 3,912,675 concerns flexographic inks containing a filler, 5–35% by weight of an acrylic resin, 5–20% of one or more natural resins selected from copal, dammar and shellac, and a solvent containing at least two of an aromatic hydrocarbon, an alcohol, an ester, and a glycol ether. The acrylic polymer allegedly has a molecular weight of 30,000–300,000, a $T_g$ of 20°–105° C., and may be of isobutyl methacrylate and methacrylic acid (ratios not being given). The intrinsic viscosities given in the examples define polymers which in our experience would have molecular weights no higher than a few hundred. At column 5, lines 35–50, the dynamic viscosities at 25° C. (no solvent specified) are given as 210–400 centipoises for Examples 1–6 and 240–350 centipoises for comparative Examples 1–5. Some of the copolymers are impractical; for our uses in order to get a $T_g$ of >20° with lauryl methacrylate and acrylic acid at least 65% acid would be needed. Such a polymer would not be soluble in aliphatic hydrocarbons, nor would it be compatible with limed rosin.

U.S. Pat. No. 4,005,022 to Vijayendran discloses a liquid toner, for developing electrostatic images, containing (A) 9–99 parts of a saturated aliphatic hydrocarbon having a Kauri-butanol number of 25–35, (B) 1–10 parts of an intensifier. The intensifier (B) contains (1) 1–10 parts soap, 80–97 parts aliphatic hydrocarbon, and (3) 3–20 parts of a concentrate. The concentrate (3) contains (a) 8–14 parts pigment, (b) 120–200 parts of an acrylic or other polymer, (c) 180–240 parts saturated hydrocarbon and (d) 0.03–6 parts pigment. The acrylic polymer "Neocryl B-707" mentioned by Vijayendran ("a terpolymer composed of vinyl toluene, i-butyl methacrylate and lauryl or stearyl methacrylate") appears to be similar to the acid-free isobutyl methacrylate-vinyl toluene copolymers of Brown et al U.S. Pat. No. 3,417,041 (prepared by suspension polymerization using a chain transfer agent to give a low molecular weight). The useful polymers had viscosities in Varsol No. 3 of from 37 to 110 centipoises. Similar waxy polymers made with higher alkyl methacrylates and acids are shown by Finn et al. U.S. Pat. No. 3,532,654 for floor polish emulsions.

DETAILED DESCRIPTION OF THE INVENTION

According to the present invention, by utilizing a relatively specific polymer composition, preferably obtained by emulsion polymerization, followed by spray drying, freeze drying, etc., a solid, high molecular weight highly efficient thickener for organic solvent systems, particularly aliphatic hydrocarbon solvents, is obtained. The emulsion polymerization gives the desired high molecular weight and the monomer proportions and selection gives compatibility and efficient thickening properties with solvents rich in aliphatic hydrocarbons. In particular the thickeners are efficient thickeners for Lactol spirits (which is a trademark for solvent naphtha, an aliphatic "naphtha" which vaporizes in the toluene evaporation range and is a blend of aliphatic hydrocarbons and a minor amount of aromatic hydrocarbons) especially when used in gravure inks containing metallated rosin as a binder. Predominantly aliphatic hydrocarbon compositions containing a high proportion of aromatic hydrocarbons such as toluene are also efficiently thickened by the compositions of the invention. The thickeners of the invention are efficient in thickening non-polar solvent systems containing other hydrocarbons, such as toluene and other aromatics, as well as for other non-polar solvents for example perchloroethylene, and although effective, are less efficient thickeners for systems containing polar solvents, such as oxygenated solvents including acetone, isopropanol, ethylacetate, or ethylene glycol monobutyl ether. Preferably the solvent contains at least 50%, more preferably at least 70%, of a liquid alkane (sometimes referred to as an aliphatic hydrocarbon).

In the drawing, the viscosity profiles, on a logarithmic scale, versus solids content of copolymers of isobutyl methacrylate and methacrylic acid containing various amounts of acid, are shown to be comparable to T-10 ethyl cellulose, a commonly used commercial thickener. The viscosities in centipoises of the compositions were determined by measuring the viscosity of a 15% solution of the polymer in toluene and then diluting to 10%, 7.5%, and 5% with Lactol spirits. The viscosity profile is compared to a reference curve for T-10 ethyl cellulose.

Gravure ink vehicles are known which are based on metallated rosin resins modified with T-10 grade ethyl cellulose or by ethylhydroxyethyl cellulose, as has been noted heretofore. These inks are commonly used in high volume publication gravure printing of Sunday newspaper supplements, quality magazines, and mail order catalogues. The thickeners of the invention have viscosity profiles quite similar to "T-10" ethyl cellulose (sold by Hercules, Inc.), and are compatible with metallated rosin, e.g., limed rosin binders, maleated rosin, etc. The conventionally used ethyl cellulose as well as the thickeners of the invention have the advantages of being soluble in non-polar solvents such as a blend of Lactol spirits and toluene in the ratios of 92:8. The high viscosity provided by the thickeners at a low solids content of the thickener in the solvent, of between about 1% and 15% solids of the thickeners on total composition, gives compatibility with metallated rosins such as limed rosin, and contributes to hold-out, gloss, adhesion, and rub and scratch resistance to the ink film. In place of limed rosin, other conventional ink binders are useful, including rosin metallated with other polyvalent metal compounds, maleated rosin and other rosin esters, terpene resins, and the like. The weight ratios of resinous binder:solvent:thickener are between 0 and 40 parts binder, preferably at least 1 part binder:4 and 100 parts solvent:1 part thickener, by weight. Usually, in an ink at least 1 part binder per 1 part of thickener is used. Preferably the ratios are 5-35 binder: 5-80 solvent: 1 thickener. The total thickener comprises 50%-100% of the addition polymerized thickener of the invention, optionally with $\leq 50\%$ of the prior art thickeners ethyl cellulose and/or ethyl hydroxyethyl cellulose. The amount of dye or pigment is varied as needed. Other conventional additives may be used.

The thickener is an addition polymer of ethylenically unsaturated (A) hydrophobic monomers being within the hydrogen bonding class (defined hereinbelow) of from moderate to poor and (B) hydrophilic monomers being in the strong hydrogen bonding class in a ratio of between 90 (A): 10 (B) and 99.9 (A): 0.1 (B), at least about 60% of the hydrophobic monomer(s) (A) are those whose homopolymers have a solubility parameter of $\leq 8.8$, any other hydrophobic monomer(s) being such as to not destroy the organic solvent solubility of the thickener polymer. The hydrophilic monomer(s) (B) preferably comprise at least a predominant proportion of monomers containing at least one of a carboxylic acid group and a sulfonic acid group, although other hydrophilic monomers are useful.

Preferably one hydrophobic monomer is selected from at least one of a $C_3$-$C_{20}$ straight or branched chain alkyl or cycloalkyl ester of methacrylic acid or acrylic acid, each providing homopolymers having a solubility parameter of $\leq 8.8$, styrene and vinyl toluene. Particularly preferred hydrophobic monomers (A) are vinyl toluene and styrene and especially those whose homopolymers have a solubility parameter of $\leq 8.8$ selected from
i-butyl methacrylate,
s-butyl methacrylate,
t-butyl methacrylate,
t-butyl acrylate,
i-bornyl methacrylate
i-bornyl acrylate,
i-propyl methacrylate,
dicyclopentenyl methacrylate,
dicyclopentenyl acrylate.
Most highly preferred is i-butyl methacrylate.

Preferably the hydrophilic monomer is selected from acrylic acid, methacrylic acid, itaconic acid, and vinyl sulfonic acid. Methacrylic acid is most highly preferred, one reason being its particularly high efficiency in this use; for example, the acrylic and analog is much less efficient. The unsaturated carboxylic acid may be a simple monocarboxylic acid, a polycarboxylic acid, or may be a partial ester or half amide of such $\alpha,\beta$-unsaturated polycarboxylic acids, and salts thereof with a volatile base such as ammonia, or with a volatile watersoluble amine such as dimethylamine, triethylamine, triethanolamine, morpholine, N-methyl morpholine, picoline, and the like. Examples of copolymerizable ethylenically unsaturated monocarboxylic or polycarboxylic acids are sorbic, acryloxyacetic, acryloxypropionic, cinnamic, vinyl furoic, $\alpha$-chlorosorbic, methacryloxypropionic, methacryloxyacetic, p-vinylbenzoic, acrylic, methacrylic, maleic, fumaric, aconitic, atropic, crotonic, and itaconic acid, or mixtures thereof, with itaconic acid and the $\alpha,\beta$-unsaturated monocarboxylic acids, particularly methacrylic acid anti acrylic acid, being preferred. Other copolymerizable acid monomers include the alkyl half esters or partial esters of unsaturated polycarboxylic acids such as of itaconic acid, maleic acid, and fumaric acid, or the partial amides thereof with $C_2$-$C_4$ amines. Preferred half esters are the lower alkyl ($C_1$ to $C_8$) esters such as methyl acid itaconate, butyl acid itaconate, methyl acid fumarate, butyl acid fumarate, methyl acid maleate, and butyl acid maleate. Such partial esters and partial amides are considered to be "$\alpha$-$\beta$-unsaturated monocarboxylic acids," and the term as used herein includes such esters and amides. Typical hydrophilic monomers, in addition to or even in place of those containing a sulfonic acid or —COOH group, are one or more of the ethylenically unsaturated acrylamides or hydroxyacrylamides, including acrylamide, methacrylamide, methylolacrylamide, methylolmethacrylamide, hydroxyethyl acrylate, hydroxyethyl methacrylate, hydroxypropyl methacrylate, and hydroxypropyl acrylate.

The novel preferred dried emulsion copolymer of the invention is at least predominantly of (1) isobutyl methacrylate and (2) at least one acid selected from the group consisting of acrylic acid, methacrylic acid and itaconic acid in the weight ratios of (1):(2) of between 99.9:0.1 and 90:10, preferably in a ratio between about 99.5:0.5 and 96:4 and still more preferably in a ratio between about 99.5:0.5 and 97.5:2.5. As noted elsewhere herein, the preferred acid is methacrylic acid. Conventional emulsion polymerization is utilized and the resulting latex is processed to recover a dry solid material soluble in the organic solvent.

The viscosity of a solution of the thickener at a concentration of 15% in toluene ranges from about 300 to about 200,000 cps. preferably from about 500 to about 75,000 cps., more preferably about from about 750 to 10,000 cps. The weight average molecular weight ($\overline{M}w$) of the thickener, as determined by gel permeation chromatography using polymethylmethacrylate for calibration, is between about 100,000 and 2,000,000, preferably 200,000 to 2,000,000 and more preferably 300,000 to 1,500,000. While high temperature solution polymerization cannot be utilized to prepare the polymers of the invention because low molecular weight polymers are produced, other useful routes, less preferred than emulsion polymerization, are bulk polymerization and suspension polymerization.

The molecular weight of typical thickener polymers, determined by gel permeation chromatography (G.P.C.) is of the order of $\overline{M}w = 1 \times 10^6 \pm 0.5 \times 10^6$. Comparison of G.P.C. molecular weight and solution viscosity (15% in toluene) of typical replacements for T-10 ethyl cellulose (98% iBMA/2% MAA) is as follows:

| Mw × 10$^6$ | Mn × 10$^5$ | Viscosity - cps. (15% in toluene) |
|---|---|---|
| 1.02 | 2.6 | 1600 |
| 1.24 | 2.4 | 4800 |
| 1.40 | 2.25 | 4500 |

As noted above, the preferred concentration of unsaturated acid in the polymer is between 0.5% and 2.5%. One reason for this is that at the lower solids contents in the Lactol spirits/toluene solvent noted above, below about 5 or 6% solids, the higher acid content materials become less compatible. Another reason the acid level is found to be critical is that at higher acid levels, the thickener becomes less compatible with non-polar solvents and with limed rosin.

The metallated rosin binder or other resinous binders useful in the invention are well known in the ink industry as shown by the art cited above, and further description thereof is not considered necessary in the present instance. Also well known are pigments, dyes and other conventional additives for inks, particularly solvent-based gravure inks.

The copolymer of the thickener is preferably made by the emulsion copolymerization of the several monomers in the proper proportions. Conventional emulsion polymerization techniques are described in U.S. Pat. Nos. 2,754,280 and 2,795,564. Thus, the monomers may be emulsified with an anionic, a cationic, or a nonionic dispersing agent, about 0.1% to 10% thereof being used on the weight of total monomers. When water-soluble monomers are used, the dispersing agent serves to emulsify the other monomers. A polymerization initiator of the free radical type, such as ammonium or potassium persulfate, t-butyl hydroperoxide, cumene hydroperoxide, etc. may be used alone or in conjunction with an accelerator, such as potassium metabisulfite, or sodium thiosulfite. The initiator and accelerator, commonly referred to as catalyst, may be used in proportions of ½ to 2%, each based on the weight of monomers to be copolymerized. The polymerization temperature may be from room temperature to 90° C. or more as is conventional. This polymer is essentially uncrosslinked.

Examples of emulsifiers or soaps suited to the polymerization process of the present invention include alkali metal and ammonium salts of alkyl, aryl, alkaryl, and aralkyl sulfonates, sulfates and polyether sulfates/ethoxylated fatty acids, esters, alcohols, amines, amides and alkyl phenols; and complex organo-phosphoric acids, and their alkali metal and ammonium salts.

One way of describing and defining the monomers of this invention is by use of the solubility parameter concept. "Polymer Handbook", 2nd Edition, J. Brandrup and E. H. Immergut, editors (John Wiley and Sons, New York 1975) Section IV Part 15 entitled "Solubility Parameter Values" by H. Burrell, on pages IV-337 to IV-368, herein incorporated by reference, defines solubility parameter, describes how it is determined or calculated, contains tables of solubility parameters and gives further references to the scientific literature on solubility parameters. The solubility parameter is the square root of the cohesive energy density which in turn is the numerical value of the potential energy of 1 cc. of material, the potential resulting from the van der Waals attraction forces between the molecules in a liquid or solid. Burrell describes a number of ways of calculating solubility parameters from experimentally determined physical constants and two ways of calculating them from the structural formula of a molecule. The structural formula methods are normally used when the data for the calculation from physical constants are not available or are considered particularly unreliable. Calculation from the structural formula utilizes tables of group molar attraction constants such as those given on page IV-339 of the Handbook. The table of Small is preferred. See also J. L. Gardon, J. Paint Technology, 38, 43 (1966), and "Cohesive Energy Density" in "Encyclopedia of Poly. Sci. & Tech" H. Mark et al, editors.

The solubility parameter concept may be considered an extension of the old rule "like dissolves like" recognized from the early days of chemistry. A noncrosslinked polymer will normally dissolve in a solvent of similar solubility parameter and a crosslinked polymer will normally be swollen by a solvent of similar solubility parameter. Conversely, solvents with solubility parameters far from those of the polymers will neither dissolve nor swell the polymer. As given by Burrell the solubility parameter of polymers may be determined, among other ways, by measuring the swelling of the polymer in a series of solvents. Solubility parameter for polymers may also be estimated by calculation from the group molar attraction constants as mentioned above. In the usual situation, it is found that solvents with a range of solubility parameters around that of the polymer will dissolve the uncrosslinked polymer. Those skilled in the art have added the further refinement of classifying solvents as poorly, moderately and strongly hydrogen bonded solvents used to dissolve a large number of polymers. In Table 5 starting on page IV-345, there is given solubility parameters of a number of polymers determined by calculation and by other methods.

The following table contains a list of monomers along with values (where the values were in readily available sources) of their solubility parameters, the solubility parameter of homopolymers of given monomers, and the hydrogen bonding class appropriate for the monomer. The solubility parameter values and hydrogen bonding class of most of these monomers are those given in Table 1 of Burrell. Values for monomers not in Burrell's table are determined or computed following the teachings in Burrell's writings v.s. Dimensions for the solubility parameters given in the table are the usual ones, square root of (calories per cubic centimeter). The hydrogen bonding class strong, moderate or poor is ascertained by using the method of C. M. Hansen, Journal of Paint Technology, Vol. 39, p. 104–117 and 505–514 (1967).

aliphatic hydrocarbons. The solubility parameters of homopolymers of the main proportions of the mono-

| Monomer | Monomer* Solubility Parameter | Homopolymer* Solubility Parameter | Hydrogen Bonding Class | High MW Homo-Polymer $T_g$ °C. | Abbre. |
|---|---|---|---|---|---|
| Acrolein | 9.8 | — | S | — | Acr. |
| Acrylamide | — | — | — | 165 | AM |
| Acrylic Acid | 12.0 | — | S | >100 | AA |
| Acrylonitrile | 10.5 | 13 | — | 106 | AN |
| o-Bromostyrene | 9.8 | — | P | — | BrSt |
| 1,3-Butadiene | 7.8 | 8.2 | P | ~ —44 | Bd |
| i-Bornyl methacrylate | — | 8.2 | — | 144 | i-BOMA |
| i-Bornyl acrylate | — | 8.2 | — | 94 | i-BOA |
| i-Butyl acrylate | 8.5 | 8.7 | M | —24 | i-BA |
| n-Butyl acrylate | 8.6 | 9.0 | M | —56 | BA |
| t-Butyl acrylate | — | 8.7 | — | —22 | t-BA |
| n-Butyl methacrylate | 8.2 | 8.8 | M | 22 | BMA |
| i-Butyl methacrylate | — | 8.6 | — | 48 | i-BMA |
| s-Butyl methacrylate | — | 8.7 | — | 60 | s-BMA |
| t-Butyl methacrylate | — | 8.6 | — | 107 | t-BMA |
| t-Butylaminoethyl methacrylate | — | — | — | 33 | t-BAEMA |
| o-Chlorostyrene | 9.6 | — | P | 119 | ClSt |
| Cyclohexyl methacrylate | — | — | — | 66 | CHMA |
| i-Decyl acrylate | 8.2 | — | M | — | i-DA |
| Dicyclopentenyl methacrylate | — | — | — | — | DCPMA |
| Dimethylamino ethyl methacrylate | 7.0 | — | S | — | DMAEMA |
| Ethyl acrylate | 9.6 | 9.4 | M | —22 | EA |
| Ethyl methacrylate | 8.3 | 9.0 | — | 65 | EMA |
| Dihydroxypropyl methacrylate | 9.0 | — | S | — | DHPMA |
| Ethylhexyl acrylate | 7.8 | — | M | ~ —70 | EHA |
| Fumaric acid | — | — | S | — | FumA |
| Fumaric half esters and half amides | — | — | S | — | — |
| 1-Hexene | 7.4 | — | P | — | hex |
| 2-Hydroxyethyl methacrylate | 8.0 | — | S | 55 | HEMA |
| Hydroxypropyl methacrylate | — | — | S | 73 | HPMA |
| Isoprene | 7.4 | — | P | —73 | Ipn |
| Isopropyl methacrylate | — | 8.8 | — | 81 | i-PMA |
| Itaconic acid | — | — | S | — | IA |
| Maleic anhydride | 13.6 | — | S | — | MAn |
| Maleic anhydride half esters and half amides | — | — | S | — | — |
| Methacrylic acid | 11.2 | — | S | >106 | MAA |
| Methyl acrylate | 8.9 | 10.1 | M | 9 | MA |
| Methyl methacrylate | 8.9 | 9.3 | M | 105 | MMA |
| Methylolacrylamide | — | — | S | — | MOA-100 |
| α-Methylstyrene | 8.5 | — | P | 155 | MeSt |
| Phenyl methacrylate | — | — | M | ~105 | PhMA |
| n-Propyl methacrylate | — | 8.8 | — | 35 | n-PMA |
| Styrene | 9.3 | — | P | 100 | St |
| Tetradecyl acrylate | — | — | — | 20 | TDA |
| Vinyl acetate | 9.0 | 9.4 | M | 30 | VAc |
| Vinyl chloride | 7.8 | 9.7 | M | 82 | VCl |
| Vinyl sulfonic acid | — | — | S | — | VS acid |
| Vinyl toluene | 9.1 | — | P | — | VTol |

*K.L. Hoy, J. Paint Technology 42, 76–118 (1970) and other sources.
S = Strong
P = Poor
M = Moderate The thickener polymers of the invention are soluble in $C_6$–$C_{10}$ normal alkanes at 20°–25° C.; such solubility is meant wherever reference is made to solubility in aliphatic hydrocarbons. The solubility parameters of homopolymers of the main proportions of the monomers used are ≦8.8, of course with the proviso that the monomer identity and quantities thereof are such as to not prevent solubility of the thickener in aliphatic hydrocarbons. For example, substantial quantities of methyl methacrylate are not used for the reason that, although the solubility parameter of the monomer is about 8.8 and the hydrogen bonding class is medium, the homopolymer solubility parameter of this monomer is about 9.3 and in copolymers it may adversely affect solubility of the polymeric thickener in aliphatic hydrocarbon solvents.

The $T_g$ of the polymeric thickener is $\geq 30°$ C., preferably $\geq 40°$ C. As a practical limit, 100° C. may be attained.

Molecular weight is determined by gel permeation chromatography, utilizing polymethylmethacrylate for calibration, further details being given below.

Second order transition temperature or glass transition temperature ($T_g$) is the temperature at which the polymer changes from a glassy state to a rubbery state, calculated as noted above. The calculated $T_g$ of the polymer is determined by calculation based upon the $T_g$ of homopolymers of individual monomers as described by Fox, Bull. Am. Physical Soc. 1, 3, page 123 (1956). Tables of the $T_g$ of homopolymers are given in "Polymer Handbook" Section III, Part 2 by W. A. Lee and R. A. Rutherford. Of course, the actual $T_g$ may be measured by known methods.

In drying the latex to give a particulate product, any suitable method may be used, preferably involving spraydrying, but freeze-drying or other methods may also be used. If bulk or suspension polymerization is used, suitable grinding means are used to produce granules or powders.

A gravure ink formulation useful with thickener polymers of the following examples is:

|  | | Nonvolatiles | Volatiles |
|---|---|---|---|
| TiO$_2$(R-900 grade) | | 21.7 | 21.7 | — |
| Limed rosin vehicle (60% solids in Lactol spirits) | | 45.7 | 27.4 | 18.3 |
| Lactol spirits | | 21.7 | — | 21.7 |
| Thickener polymer (15% solids in toluene) | | 10.9 | 1.6 | 9.3 |
| | | 100.0 | 50.7 | 49.3 |

This formulation may serve as a substitute for conventional Type A and Type B gravure publication inks, which are suitably formulated as follows:

| Type A | | | Type B | |
|---|---|---|---|---|
| Material | pbw | pbw | Material | pbw |
| Pigment (organic type) | 7 | 10 | Pigment (inorganic type; e.g., TiO$_2$) | 30 |
| Pigment extender (e.g., limestone or clay). | 20 | 10 | | |
| Limed rosin | 20 | 20 | Limed rosin | 38 |
| Lactol spirits | 51 | 40 | Lactol spirits | 30 |
| Ethyl cellulose | 2 | 3 | Ethyl hydroxyethyl | |
| Toluene | 0 | 17 | cellulose | 2 |
| | 100 | 100 | | 100 |

Similar typical formulations are given in the publication "Printing Ink, A Multiclient Market Survey" Hull & Co., 77 Randfield Road, Bronxville, N.Y. 10708, August 1973, pages 42–47 of which are incorporated herein by reference. A Type A gravure ink formula is given in which 30 parts of limed rosin containing small amounts of wax and plasticizer are blended with 15 parts pigment and clay, containing for example 4–8% organic pigment or about 10% black pigment, with 55 parts aliphatics such as Lactol spirits or heptane. The solvent typically contains appreciable amounts of aromatic solvents as impurities. Such a formulation is as shipped to the printer, who may add up to 1 part of additional solvent for each part of ink.

A practical test for suitability as a thickener for solvent systems, including gravure inks, is one in which the pigment is omitted, as in the examples herein below.

A procedure for preparing an emulsion polymer useful in the invention is as follows:

| Substance | Parts by Weight |
|---|---|
| Water | 60.33 |
| Surfactant (sodium lauryl sulfate) | 0.02 |
| iBMA (isobutyl methacrylate) | 38.71 |
| MAA (methacrylic acid) | 0.79 |
| Sodium dithionite | 0.02 |
| Ammonium persulfate | 0.13 |
| | 100.00 |

PROCEDURE

1. Charge about 50 parts of the water to stirred reaction flask and heat contents.
2. Prepare monomer emulsion in separate vessel as listed below:
   a. Charge remaining water
   b. Add surfactant
   c. Mix the monomer (98 iBMA/2 MAA) into the surfactant solution
   d. Stir well to form a stable monomeric emulsion.
3. Gradually add emulsion to the reactor and initiate polymerization at 80°–85° C. using peroxy disulfate. Maintain temperature at 80°–85° C. until all of the monomer has been added.
4. Hold at 80°–85° C. for 30 minutes.
5. Cool the batch and pack.

PROPERTIES

% Total Solids: 40–42% pH: 2.5

A similar procedure noted in the examples, using using sodium dodecyl benzene sulfonate in place of sodium lauryl sulfate is also useful. It may be important from an odor standpoint to eliminate residual monomer as nearly as possible. This may be accomplished by means of reduced pressure, introducing additional initiator at the end of the reaction, adsorption of monomer by solid adsorbents, etc. Total solids content may be from about 30% to 50% or more. Particle size is not critical and may be from 0.05 to 1 in the usual case. The resulting latex is spray dried or freeze dried, preferably spray dried, to a powder. The latex usually has an acid pH as made, but may be neutralized or made alkaline with conventional bases, including ammonia, amines, etc. but this is not necessary. For instance, the latex of Example 9 was neutralized with ammonia before drying whereas the others were not.

To determine compatibility of the thickener with limed rosin and solvent, the test method utilized is to determine the solution clarity and dried film clarity initially, and after 24 hours at room temperature, of solutions made up as follows:

|  | Solution | Nonvolatiles |
|---|---|---|
| Thickener (45% in toluene) | 8 g | 3.6 g |
| Limed rosin (60% in lactol spirits) | 43 g | 25.8 g |
| Hexane/heptane 1/1 by weight | 490 g | 0.0 g |

As solvents for the thickeners of the invention, suitable aliphatic hydrocarbons (alkanes), which are the preferred solvents, include ligroine (benzine, petroleum ether, coal tar light oil, petroleum naphtha), cycloalkanes such as cyclohexane and ethylcyclohexane, $C_5$–$C_{10}$ alkanes, etc., generally boiling in the range of 30° C.–175° C. These "weak" solvents are those which are conventional in the printing ink industry.

Strong aromatic solvents such as xylene, benzene and toluene are not normally used in the present invention in quantities greater than about 10% of the total solvent being thickened. The term "aliphatic hydrocarbon solvent" as used herein permits of the inclusion of such small amounts of aromatics. In some cases, a small proportion of a solvent such as toluene is inherently present in the aliphatic hydrocarbon as an impurity or may be deliberately added. For example, some "aliphatic" hydrocarbons contain an aromatic impurity. Such strong solvents are sometimes necessary, as in the case of "T-10" ethyl cellulose, which is not soluble in pure lactol spirits in the absence of small amounts of toluene. Of course, the thickener must be compatible with the binder as well as the solvent.

As may be noted from the following examples, the polymerization conditions, and those conditions in relation to proportions of monomers, are important in obtaining products having usable viscosities. Comparative Example B used a chain terminator which gave a low molecular weight polymer as did Examples C and D. One distinction between comparative Example F and Example 1 is in the level of acid. As may be noted, the criteria for a useful product include the viscosity and molecular weight, solvent and binder compatibility, etc. The following Table I gives the polymerization variables and monomer variables of examples in accordance with the invention, and comparative examples of materials outside of the invention.

TABLE I

| Example | Composition Composition % | Initiator[1] | Reaction Temp. °C. | Total Solids % | Surfactant[1] | MFT °C. | Polymerization Procedure |
|---|---|---|---|---|---|---|---|
| 1 | 99 iBMA/1 MAA | 11% NaPS | 80 | 40 | 0.035%[2] | 70 | Thermal |
| 2 | 99 iBMA/1 MAA | 0.3% NH4PS, 0.1% Lydopon, 0.1% NaBS[3] | 60 | 37 | 1.7% | 70 | Redox |
| 3 | 99 iBMA/1 MAA | 0.1% DIBHP, 0.05% Formopon, 0.01% Lykopon | 50 | 28 | 0.5% | — | Redox |
| 4 | 98 iBMA/2 MAA | 0.33 NH4PS | 80 | 40 | 0.22% | — | Thermal |
| 5 | 98 iBMA/2 MAA | 0.22% NaPS | 80 | 39 | 0.035% | — | Thermal |
| 6 | 98 iBMA/2 MAA | 0.11% NaPS | 80 | 40 | 0.035% | — | Thermal |
| 7 | 99 iBMA/1 MAA | 0.27% CHP, 0.01% Formopon, 0.01% Lykopon | 50 | 29 | 0.5% | — | Redox |
| Comparative Example |  |  |  |  |  |  |  |
| A | 99 iBMA/1 MAA | 0.27% CHP, 0.005% Formopon, 0.01% Lykopon | 54 | 30 | 0.5% | 73 | Redox |
| B | 99 iBMA/1 MAA | 0.22% NaPS, 5% BTM | 80 | 40 | 0.035% | 55 | Thermal |
| C | 99 iBMA/1 MAA | 0.22% NaPS, 1.5% BTM | 80 | 40 | 0.035% | 64 | Thermal |
| D | 99 iBMA/1 MAA | 0.22% NaPS, 3.0% BTM | 80 | 40 | 0.035% | 64 | Thermal |

[1] Based on total monomers.
[2] Sodium dodecyl benzene sulfonate. in Examples 1–14 and A–E inclusive
[3] Lykopon and Formopon are registered trademarks
AA acrylic acid
n-BA normal butyl acrylate
iBMA isobutyl methacrylate
n-BMA normal butyl methacrylate
MAA methacrylic acid
NaBS sodium bisulfite
NaPS sodium persulfate
NH4PS ammonium persulfate
BTM bistribromomethane
Lykopon sodium dithionite
Formopon sodium formaldehyde sulfoxylate The viscosity properties of the polymers in solvent and of the formulated inks are given in Table II. In all cases the molecular weights ($\overline{M}w$) of the addition-polymerized polymeric thickeners of the invention as determined by gel permeation chromatography, are within the range of 100,000–2,000,000, and for the most part are within the range 300,000–1,500,000. The products of the Comparative Examples are outside of these ranges or are unsatisfactory for other reasons.

TABLE II

| Example Number | 15%* in Toluene cps. | 10%* in Tol/Lac Sp, cps.** | 7.5%* in Tol/Lac Sp, cps. | 5%* in Tol/Lac Sp, cps. | Blend with Limed Rosin (3.4 g solids*/ 14.4 g. toluene/43 g Limed Rosin/ 149 g Lac. Sp) cps. |
|---|---|---|---|---|---|
| 1 | 4,250 | 795 | 105 | 21 | 35 |
| 2 | 1,750 | 238.5 | 67 | 14 | 15 |
| 3 | 3,275 | 283.0 | 77 | 15 | 20 |
| 4 | 3,700 | 400 | 90 | 18 | 33*** |

TABLE II-continued

| Example Number | 15%* in Toluene cps. | 10%* in Tol/Lac Sp, cps.** | 7.5%* in Tol/Lac Sp, cps. | 5%* in Tol/Lac Sp, cps. | Blend with Limed Rosin (3.4 g solids*/ 14.4 g. toluene/43 g Limed Rosin/ 149 g Lac. Sp) cps. |
|---|---|---|---|---|---|
| 5 | 11,600 | 850 | 200 | 25 | 125 |
| 6 | 30,000 | 2,000 | 220 | 50 | 180 |
| 7 | 34,400 | 3,750 | 630 | 70 | 180 |
| Comparative Examples | | | | | |
| A | | | | | 2,900 |
| B,C,D, - Viscosities low | | | | | |
| E (T-10 Ethyl cellulose) | 1,150 | 210 | 95 | 22 | 90 |
| F (Dupont's Elvacite 2045) | 22 (Viscosity too low) | | | | |
| G (Dupont's Elvacite 2046) | 15 (Viscosity too low) | | | | |

*Thickener solids
**Tol/Lac Sp = Lactol spirits added to 15% solids in toluene to give specified solids of 5%, 7.5% and 10%
***(4.5 g solids*/1.7 g toluene/98 g Limed Rosin/138 g Lac Sp)

Gel permeation chromatograms for use in estimating molecular weights are run on equipment commercially marketed by Waters Associates of Marlboro, Mass. "Styragel" columns are available prepacked in a variety of porosites. A column set is normally composed of four or five four-foot (1.22 m) sections chosen to cover the molecular weight range to be measured. With column sets of this length sufficient resolution is obtained so that axial dispersion can be disregarded. The column set must be calibrated for the polymer type the molecular weight of which is to be determined. Narrow molecular weight standards are available for polystyrene. Calibration curves for other polymers such as polymethyl methacrylate are constructed from the chromatograms of broad samples using either an approximate distribution technique[1] or a universal calibration curve technique[2]. To calculate the molecular weights of unknown samples a table is prepared of the value $W_i$, of the GPC curve above baseline at equal volume increments and the molecular weight $M_i$, read from the calibration curve at these volumes. The weight average molecular weight $\overline{M}w$, and the number average molecular weight $\overline{M}n$, can be calculated from these values with the equations $$\overline{M}w = \frac{\Sigma W_i M_i}{\Sigma W_i} \quad \overline{M}n = \frac{\Sigma W_i}{\Sigma (W_i/M_i)}$$
$$\Sigma W_i = 1$$

It is to be realized that the molecular weight numbers given are approximate and not precise, but are validly used for comparative purposes, particularly with polymers of similar compositions, and using the same calibration standard.

[1] Calibration of Gel-Permeation Column with Unfractionated Polymers, A. Weiss, E. Ginsberg, J. Poly. Sci., Pt. A-2, 8 (1970).
[2] A note on the Universal Calibration Curve for Gel Permeation Chromatography—A. Weiss, E. Ginsberg, Poly. Letters, 7, 379-381 (1969)

Unless otherwise stated, all parts and percentages given herein are by weight.

We claim:

1. A thickened organic solvent composition containing dissolved therein a thickening amount of an addition polymer of ethylenically unsaturated (A) hydrophobic monomers being in the hydrogen bonding class of from moderate to poor, and (B) hydrophilic monomers being in the strong hydrogen bonding class, in a ratio of between 90(A):10(B) and 99.9(A):0.1(B), at least about 60% of the hydrophobic monomer or monomers being those whose homopolymers have a solubility parameter of $\leq 8.8$, any other hydrophobic monomer(s) and all hydrophilic monomers being such, in quantity and nature, as to not destroy the organic solvent solubility of the addition polymer, the $T_g$ of the polymer being $\geq 30°$ C., and the weight average molecular weight of the polymer being from about 100,000 to 2,000,000.

2. The composition of claim 1 in which said solvent contains at least 50% of a liquid saturated aliphatic hydrocarbon, said molecular weight is from 200,000 to 2,000,000, at least 60% of said hydrophobic monomer (A) is selected from at least one $C_3$–$C_{20}$ alkyl, cycloalkyl or aryl ester of acrylic acid or methacrylic acid, each providing homopolymers having a solubility parameter of $\leq 8.8$, and styrene and vinyl toluene, the ethylenically unsaturated hydrophilic monomer or monomers (B) comprising at least a predominant proportion of monomers containing at least one of a carboxylic acid group and a sulfonic acid group, and said addition polymer is prepared by emulsion polymerization.

3. The composition of claim 2 in which the viscosity of a solution of 15 parts of the polymer in 85 parts of toluene is between about 300 and about 200,000 cps. and said hydrophilic monomer (B) at least in part is selected from one or more of acrylic acid, methacrylic acid, itaconic acid, vinylsulfonic acid, maleic anhydride, maleic acid and fumaric acid half esters with $C_1$–$C_6$ alcohols, and half amides with $C_2$–$C_4$ amines, any additional hydrophilic monomer being selected from at least one of acrylamide, methacrylamide, methylolacrylamide, methylolmethacrylamide, hydroxyethyl methacrylate or acrylate, and hydroxypropyl acrylate or methacrylate.

4. The composition of claim 2 in which said monomer (A) is selected from i-butyl methacrylate, s-butyl methacrylate, t-butyl methacrylate, t-butyl acrylate, i-bornyl methacrylate, i-bornyl acrylate, i-propyl methacrylate, dicyclopentenyl methacrylate, dicyclopentenyl acrylate, styrene, and vinyl toluene, said solvent is composed of at least about 70% of a liquid alkane, said molecular weight is from 300,000 to 1,500,000, said viscosity is from about 500 to about 75,000 cps., and said $T_g$ is $\geq 40°$ C.

5. The composition of claim 4 in which said monomers consist essentially of said hydrophobic monomer (A) whose homopolymers have a solubility parameter of $\leq 8.8$, and said hydrophilic monomer (B) is at least one of acrylic acid, methacrylic acid, itaconic acid and vinylsulfonic acid, present in an amount of between about 0.5% and 4% of the total monomers.

6. The composition of claim 5 in which said monomer (A) is isobutyl methacrylate, and monomer (B) is methacrylic acid present in an amount between about 0.5% and 2.5% of the total monomers.

7. The composition of claim 1 in the form of a printing ink containing an alkane-soluble resinous binder dissolved therein, the ratios of binder:solvent:thickener being between 1 and 40 parts binder:4 and 100 parts solvent:1 part thickener.

8. The composition of claim 2 in the form of a printing ink containing an alkane-soluble resinous binder dissolved therein, the ratio of binder:solvent:thickener being between 1 and 40 parts binder:4 and 100 parts solvent:1 part thickener.

9. The composition of claim 3 in the form of a printing ink containing an alkane-soluble resinous binder dissolved therein, the ratio of binder:solvent:thickener being between 1 and 40 parts binder:4 and 100 parts solvent:1 part thickener.

10. The composition of claim 4 in the form of a printing ink containing an alkane-soluble resinous binder dissolved therein, the ratio of binder:solvent:thickener being between 5 and 35 parts binder:5 and 80 parts solvent:1 part thickener.

11. The composition of claim 5 in the form of a printing ink containing an alkane-soluble resinous binder dissolved therein, the ratio of binder:solvent:thickener being between 5 and 35 parts binder:5 and 80 parts solvent:1 part thickener.

12. The composition of claim 6 in the form of a printing ink containing an alkane-soluble resinous binder dissolved therein, the ratio of binder:solvent:thickener being between 5 and 35 parts binder:5 and 80 parts solvent:1 part thickener.

13. The composition of claim 7 in which the binder is metallated rosin.

14. The composition of claim 8 in which the binder is metallated rosin.

15. The composition of claim 9 in which the binder is metallated rosin.

16. The composition of claim 10 in which the binder is metallated rosin.

17. The composition of claim 11 in which the binder is metallated rosin.

18. The composition of claim 12 in which the binder is metallated rosin.

19. A copolymer of isobutyl methacrylate and at least one acid selected from the group consisting of acrylic acid, methacrylic acid and itaconic acid, having a methacrylate to acid weight ratio of between about 99.9:0.1 and 90:10, the weight average molecular weight of the polymer being from 100,000 to 2,000,000, and the polymer being soluble in aliphatic hydrocarbon solvents.

20. The composition of claim 19 in which the copolymer is an emulsion polymerized polymer in dry form, said ratio is between about 99.5:0.5 and 96:4, and said molecular weight is from about 200,000 to 2,000,000.

21. The composition of claim 20 in which the acid is methacrylic acid.

22. The composition of claim 21 in which said ratio is between 99.5:0.5 and 97.5:2.5 and said molecular weight is between about 300,000 and 1,500,000.

23. In a pigmented ink containing a resinous binder, a pigment or dye, an organic solvent and a thickener, the improvement in which the thickener is the polymer of claim 19.

24. The ink of claim 23 in which said ratio is between 99.5:0.5 and 96:4, the weight ratios of binder:solvent:thickener being from 1 to 40 parts binder:4 to 100 parts solvent:1 part thickener.

25. The ink of claim 24 in which said ratio is between 99.5:0.5 and 97.5:2.5.

26. The ink of claim 25 in which the acid is methacrylic acid.

27. The ink of claim 23 which is gravure ink, the binder is limed rosin and the solvent is at least predominantly one or more liquid aliphatic hydrocarbons.

28. The ink of claim 24 which is gravure ink, the binder is limed rosin and the solvent is at least predominantly one or more liquid aliphatic hydrocarbons.

29. The ink of claim 25 which is gravure ink, the binder is limed rosin and the solvent is at least predominantly one or more liquid aliphatic hydrocarbons.

30. The ink of claim 26 which is gravure ink, the binder is limed rosin and the solvent at least predominantly is one or more liquid aliphatic hydrocarbons.

31. A method of printing comprising gravure printing with the ink of claim 24, and curing the ink.

* * * * *